(12) United States Patent
Rice et al.

(10) Patent No.: US 9,002,906 B1
(45) Date of Patent: Apr. 7, 2015

(54) SYSTEM AND METHOD FOR HANDLING LARGE TRANSACTIONS IN A STORAGE VIRTUALIZATION SYSTEM

(75) Inventors: James Preston Rice, Menlo Park, CA (US); Philip Love, Alhambra, CA (US)

(73) Assignee: EMC Corporation, Hopkinton, MA (US)

( * ) Notice: Subject to any disclaimer, the term of this patent is extended or adjusted under 35 U.S.C. 154(b) by 1076 days.

(21) Appl. No.: 12/059,911

(22) Filed: Mar. 31, 2008

(51) Int. Cl.
G06F 17/30 (2006.01)

(52) U.S. Cl.
CPC ........ G06F 17/30203 (2013.01); G06F 17/301 (2013.01); G06F 17/30327 (2013.01)

(58) Field of Classification Search
None
See application file for complete search history.

(56) References Cited

U.S. PATENT DOCUMENTS

| | | | | |
|---|---|---|---|---|
| 7,801,894 | B1 * | 9/2010 | Bone et al. | 707/737 |
| 2002/0069318 | A1 * | 6/2002 | Chow et al. | 711/104 |
| 2002/0133491 | A1 * | 9/2002 | Sim et al. | 707/102 |
| 2003/0051113 | A1 * | 3/2003 | Beardsley et al. | 711/163 |
| 2005/0257000 | A1 * | 11/2005 | Sonoda et al. | 711/112 |

* cited by examiner

*Primary Examiner* — James Trujillo
*Assistant Examiner* — Miranda Huang
(74) *Attorney, Agent, or Firm* — Dergosits & Noah LLP; Todd A. Noah

(57) ABSTRACT

The present invention provides a system and method for handling large transactions by a storage virtualization system. Current storage virtualization systems can only manage a limited number of data objects stored on an associated NAS system because of the cost or hardware constraints of physical main memory. The present invention will enable a storage virtualization system to increase the number of data objects managed by a factor of five or more by using an associated secondary memory store, such as a disk, to store information or metadata about data objects stored on associated NAS systems. The invention also provides a method for moving metadata from the storage virtualization system memory to the secondary store and back, and recovering metadata if corrupted. The invention thereby increases the number of data objects handled by the storage virtualization system with negligible loss of performance as perceived by clients of the storage virtualization system.

20 Claims, 2 Drawing Sheets

SYSTEM AND METHOD FOR HANDLING LARGE TRANSACTIONS IN A STORAGE VIRTUALIZATION SYSTEM

TECHNICAL FIELD

The present invention relates generally to storage virtualization systems, and specifically, to a system and method for expanding the data object management capabilities of a storage virtualization system.

BACKGROUND OF THE INVENTION

Organizations use storage virtualization systems to manage data objects stored on multiple network attached storage ("NAS") systems. A storage virtualization system can migrate data objects from one NAS system (the "source," "source server" or "src") to another NAS system (the "destination," "destination server" or "dst"). A storage virtualization system can also synchronize data objects between two NAS systems. In order to perform these operations, a storage virtualization system will typically be placed as an intermediary between the NAS system that stores the data objects and the client computer that accesses or requests access to the stored data objects. The client computer, storage virtualization system and the associated NAS system may be connected over a network. The storage virtualization system may begin performing its migration or synchronization operations once a second NAS system is added to the network. Storage virtualization provides a mechanism for real-time or near real-time data object management without requiring a shutdown or disconnection of NAS resources, or any intervention from users. As such, storage virtualization provides an effective and efficient way to manage data objects stored on multiple NAS systems without causing downtime or reducing productivity.

In order to efficiently perform storage virtualization operations, the storage virtualization system must be able to identify and locate the data objects stored on each of its associated NAS systems. For example, the storage virtualization system must monitor all of the data files, data directories, hard links, soft links and devices on its associated NAS systems. The storage virtualization system may therefore internally store a data structure containing information or "metadata" about the data objects stored on its associated NAS systems. The data structure may be a mapping index, a database, a File Identifier ("FID") table, or directory tree that identifies each data object and its location on the associated NAS systems. The data structure may also include relevant path address, file attributes, timestamps or other such information for those data objects. Metadata in the data structure may originate from the associated NAS system that stores the data object, or the storage virtualization system that manages the data object. Using such a data structure enables the storage virtualization system to have an updated "snapshot" of the data objects it is managing. Changes made to those data objects, such as renaming or editing data object content, may be reflected in the data structure.

Due to hardware and performance constraints, a storage virtualization system may only have a finite amount of internal physical memory in which to store the data structure. For example, a storage virtualization system with 16 gigabytes of internal memory may only be able to store information on 50-60 million data objects. As a result, the storage virtualization system may only be able to manage 50-60 million data objects. NAS system manufacturers are continuously increasing the memory and data object storage capacity of their NAS systems. As the number of data objects that can be stored on these NAS systems grows, a storage virtualization system associated with these larger NAS systems will need to keep up with the increased storage demands.

What is therefore needed is a way to increase the storage capacity of present and future storage virtualization systems so that they can manage larger numbers of data objects. The data objects themselves may be stored on a single NAS system or on multiple NAS systems associated with a storage virtualization system. What is further needed is a way to optimize the storage virtualization system's data object management capabilities without affecting performance or resulting in data loss.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

Figure 1:
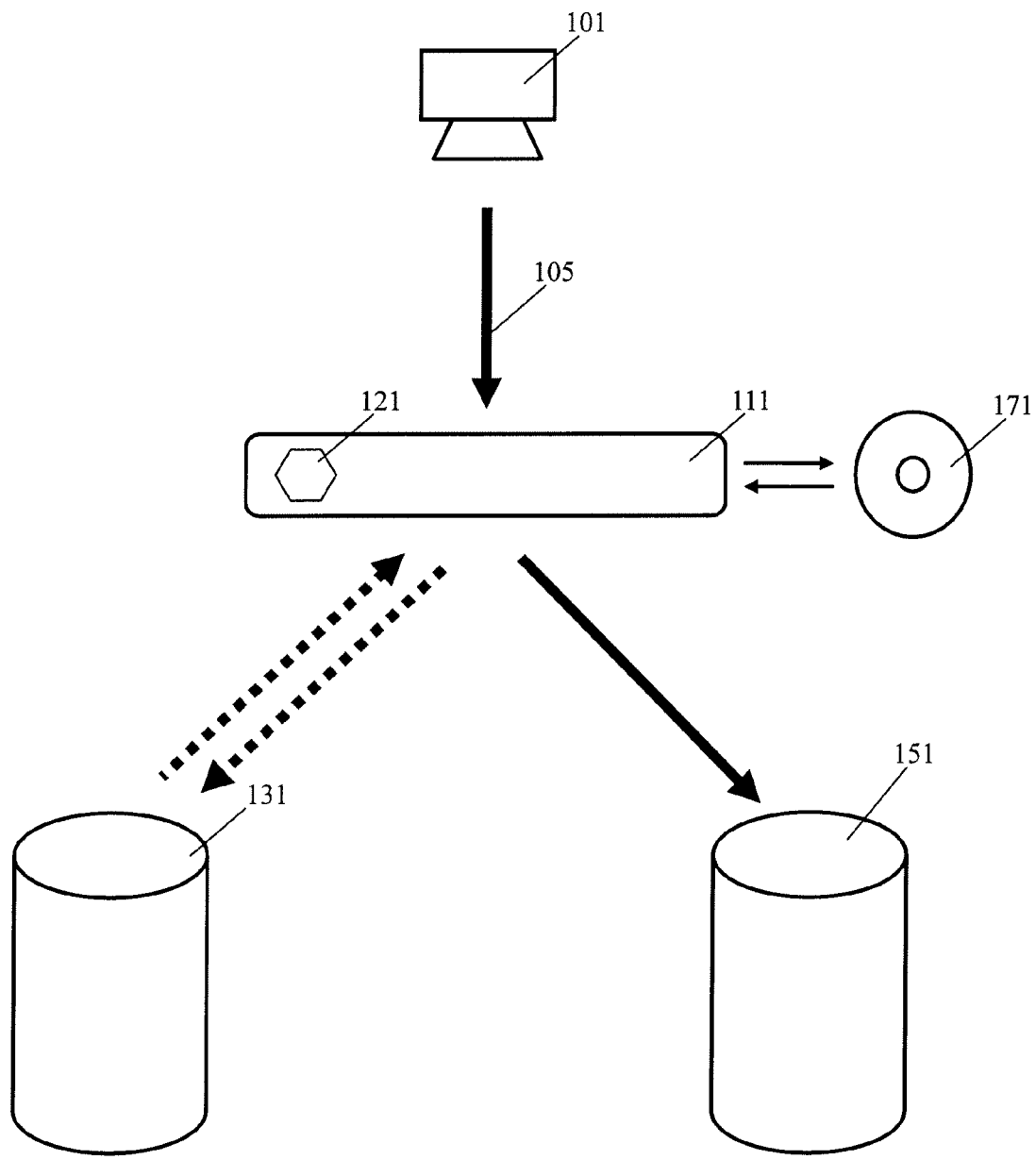
FIG. 1 is an exemplary block diagram depicting the elements of a storage virtualization system, according to one embodiment of the present invention.

The present invention increases the data object management capacity of a storage virtualization system. The present invention is a system and method for supplementing a storage virtualization system's main or primary internal memory store with a secondary memory store. The present invention thereby provides a storage virtualization system with the capacity to efficiently manage substantially more data objects, for example, five to ten times the number of data objects that can be stored in its primary internal memory. The present invention is also a system and method for efficiently allocating memory usage between the storage virtualization system's primary memory store and secondary memory store. In the disclosure herein, the system will be described first, followed by the method of the present invention.

As described herein, the metadata for a data object is distinguishable from the data object itself. For example, the data object may be a data file, in which case the data object's metadata may include the data file's name, path address, file attributes, or other associated descriptive information. Similarly, the data object may be a directory, in which case the metadata may include the directory's name, a list of the data files stored within the directory, the size of the directory, directory attributes, or other associated other descriptive information. One will appreciate that a storage virtualization system may store the metadata for data objects, rather than storing the data objects themselves. The data objects are stored on the associated NAS system.

The metadata stored by the storage virtualization system may originate from the associated NAS system, the storage virtualization system, or both. The metadata for a data object may be information used by the storage virtualization system to facilitate management of that data object. Both the primary memory store and the secondary memory store may retain up-to-date metadata on the data objects stored on an associated NAS system and managed by the storage virtualization system. This up-to-date metadata may be copied or transferred between the primary memory store and the secondary memory store depending upon the needs of the storage virtualization system. The secondary memory store may be disk storage, flash storage or other types of memory storage of any memory capacity. The secondary memory store is not designed to be temporary memory, like RAM, but rather is designed to continuously augment or complement the storage virtualization system's main or primary memory store.

In an embodiment, this metadata may be stored in one or more data structures in the storage virtualization system's primary memory store, secondary memory store, or both. In an embodiment, there may be at least two data structures: a first data structure that remains in the primary memory store, and a second data structure that is initially located in the primary memory store, but may also be transferred or copied into the secondary memory store as needed to create or add to a third data structure. As will be discussed further below, the process of transferring or copying portions of the second data structure from the primary memory store to the third data structure in the secondary memory store is "caching out." As will also be discussed below, portions of the second data structure that have been cached into the third data structure in the secondary memory store may also be cached in to the primary memory store. Caching out may promote efficiency by reducing the size of the second data structure in the primary memory store. The first data structure in the primary memory store may differ in format and content from the second data structure, but the first data structure may contain metadata that refers to corresponding metadata in the second and third data structure. The third data structure may be a copy of portions or all of the second data structure, and may therefore contain the same metadata as the second data structure.

It should be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

A. The Storage Virtualization System

A typical storage virtualization system is shown in FIG. 1. The storage virtualization system may be either directly connected or connected over a network to one or more NAS devices, systems or servers. As shown in FIG. 1, the storage virtualization system 111 may be placed as an intermediary between a source NAS server 131 and a destination NAS server 151. A client computer 101 may access or request access to data objects stored on a source NAS system 131 connected to a network 105. As an intermediary, the storage virtualization system 111 may cause data objects from the source NAS system 131 to be re-directed or migrated to destination NAS system 151. If the storage virtualization system 111 performs a re-direction operation, client computer 101 requests for access to data objects on source NAS system 131 may be re-directed by the storage virtualization system 111 to destination NAS system 151. The storage virtualization system 111 may also synchronize data objects stored on source NAS system 131 with data objects stored on destination NAS system 151, in which case requests for access to data objects on source NAS system 131 and/or data objects on destination NAS system 151 may originate from within the storage virtualization system 111.

In FIG. 1, a single storage virtualization system 111 is shown. A person skilled in the art will appreciate that storage virtualization system 111 may be a collection of hardware or software modules working together to perform storage virtualization operations. One having ordinary skill in the art may also appreciate that FIG. 1 is merely an example of how a storage virtualization system 111 might interact with a source NAS system 131 and a destination NAS system 151, and that other setups are possible without departing from the scope of the present disclosure.

1. The Primary Memory Store

As shown in FIG. 1, storage virtualization system 111 may contain, have access to, or be associated with a primary memory store 121. The primary memory store 121 may be the internal memory for the storage virtualization system, or the primary memory store 121 may be external to the storage virtualization system, and thus directly connected or connected over a network to storage virtualization system 111. A person having ordinary skill in the art will appreciate that the primary memory store 121 can be comprised of ROM, EPROM, flash, disk, tape, hard drive, optical disk, solid state or other types of memory. As noted previously and will be discussed in more detail below, the primary memory store 121 may store one or more data structures with metadata for the data objects in associated NAS system 131.

2. The Secondary Memory Store

As shown in FIG. 1, the present invention provides a storage virtualization system 111 with access to a secondary memory store 171. The secondary memory store 171 may be contained within storage virtualization system 111, or may be external or remote to storage virtualization system 111, and thus directly connected or connected over a network to storage virtualization system 111. The secondary memory store 171 can also be comprised of ROM, EPROM, flash, disk, tape, hard drive, optical disk, solid state or other types of memory. In other words, because the secondary memory store 171 is designed to work cohesively with the primary memory store 121, the secondary memory store is not comprised of RAM.

The memory capacity of the secondary memory store 171 may vary. However, in most circumstances its memory capacity will be equal to or greater than the memory capacity of the primary memory store 121. As will be discussed further below, this may enable the secondary memory store 171 to function as a backup for the one or more data structures in primary memory store 121.

The present invention augments the data object management capacity of storage virtualization system 111 by associating secondary memory store 171. Simply increasing the storage capacity of primary memory store 121 may not result in efficient data object management capacity by the storage virtualization system 111. Prior art storage virtualization systems lack the processing capability and hardware to efficiently manage large numbers of data objects. Increasing the primary memory store 121's capacity will not solve this deficiency because the memory used in prior art memory stores is much more expensive that the memory that may be used in the secondary memory store. Storage virtualization systems are generally expensive. It is more cost effective to add a secondary memory store, such as a disk, than to design and produce a storage virtualization system with a larger primary memory store.

The present invention permits storage of data structures in a primary memory store 121 and a secondary memory store 171, as shown in FIG. 1, without sacrificing speed or efficiency, while keeping costs low. The algorithms used to optimize the use of multiple memory stores and multiple data structures are described further below.

B. The Data Structures

While the association of a secondary memory store 171 to a primary memory store 121 increases the storage capabilities of the storage virtualization system 111, it does not ensure that the data object management will be efficient. The present invention provides a method for optimizing the use of the secondary memory store by improving the use of the data structures that contain metadata for the managed data.

As mentioned above, the data objects managed by the storage virtualization system 111 are stored on an associated NAS system 131. The storage virtualization system uses metadata contained in one or more data structures to manage these data objects. This metadata may originate from the associated NAS system 131 (e.g., path address). In addition, the data structures may contain metadata created by the storage virtualization system 111.

The data structures may be in the form of a mapping index, directory tree, table, array, database, list or the equivalent. They may be serialized, compressed or uncompressed, encrypted or unencrypted, or stored in any format recognized by the storage virtualization system. They may be formatted to resemble the directory structure or file system of the associated NAS system 131, or may be stored contiguously on disk storage or other media. The data structures may include the FIDs, file names, path addresses, file attributes, or other such information for the data objects stored in source NAS system 131. The data structures may be designed for quick reference or fast look up, or they may be designed to contain large amounts of metadata for the data objects stored on the associated NAS system 131.

Additionally, the data structures may contain metadata that describes the relationships between each data object, such as the directories and sub-directories that may contain certain data objects in the associated NAS system. The metadata may also describe if certain data objects forward to or are linked to other data objects in the associated NAS system. In other words, the data objects may be hard links, soft links or other types of file pointers, and so the data structures may store the path information for the file pointer target. One having ordinary skill in the art will appreciate that the storage virtualization system 111 may store any type of data structure containing any type of metadata, as long as it may be searched and recognized by the storage virtualization system 111.

The following describes, in general terms, how metadata may be gathered for use in the one or more data structures. While the following is described in the context of a single data structure, one will appreciate that the present invention may cause the storage virtualization system to create and store more than one data structure. The following is not meant to limit the scope of the present invention in any way.

In order to gather the metadata for the data structure, the storage virtualization system 111 may perform a scan of the source NAS server 131, and may store the metadata resulting from the scan as a data structure. Such a scan may be performed whenever a storage virtualization system is first connected to or associated with a NAS system. Alternatively, the storage virtualization system 111 may receive metadata for the data objects stored on source NAS server 131 from a separate source, and then this received metadata may be used to create a data structure. One with ordinary skill in the art will appreciate that the source of the data structure may vary, so long as the storage virtualization system 131 has access to a data structure containing the necessary metadata to manage data objects stored on the associated NAS system or systems.

If the storage virtualization system 111 is associated with a destination NAS server 151, then the storage virtualization system 111 may also store a data structure with metadata for data objects stored on destination NAS server 151. This data structure may also be the result of one or more scans of the destination NAS server 151. This data structure may be kept separate from the data structure for the source NAS server 131 described above, or the storage virtualization system may reconcile both sets of scan results (i.e., metadata) in order to create a single data structure that manages data objects for both the source NAS server 131 and the destination NAS server 151. One with skill in the art will appreciate that in any scenario, the data structure or structures should be current with the metadata for the data objects from all of the NAS systems associated with the storage virtualization system.

The following now describes how in the present invention, there may be two or more data structures used by the storage virtualization system 111: a first data structure and a second data structure, with each data structure containing metadata for data objects stored in an associated NAS system 131. There may also be a third data structure that is a copy of a portion or the whole of the second data structure. As described herein, the embodiment below contemplates a single associated NAS system 131. However, one skilled in the art will appreciate that the present invention may be used no matter how many NAS systems are associated with the storage virtualization system 111.

As previously mentioned, in order to coordinate memory resources between the primary memory store 121 and the secondary memory store 171, the present invention may comprise at least a first data structure and a second data structure. The first data structure may remain in the primary memory store 121. The second data structure, discussed further below, may be located in the secondary memory store 171, or may be partitioned between the primary memory store 121 and secondary memory store 171. If the second data structure is partitioned on the primary memory store 121, then that portion stored or transferred to the secondary memory store 171 may be considered a third data structure, even though it may contain some of the same content and metadata as the second data structure.

1. The First Data Structure in the Primary Memory Store

In an embodiment, the first data structure is only located in the primary memory store 121. The purpose of the first data structure is twofold: (1) to confirm whether or not a data object is managed by the storage virtualization system, and (2) to direct the storage virtualization system to the second or third data structures to obtain additional metadata for the managed data object. In an embodiment, the first data structure is an index of FIDs for data objects stored on associated NAS system 131 managed by the storage virtualization system 111. If a client computer requests access through the storage virtualization system 111 to a data object stored on the associated NAS system 131, the storage virtualization system 111 looks up the FID on the first data structure and confirms whether or not the FID exists. If it does not exist, then the requested data object is not managed by the storage virtualization system 111. A person having ordinary skill in the art will appreciate that the FID is an identifier for a data object, which may be its file name, inode number, file handle or the equivalent, depending upon the NAS system where the requested data object is stored.

A Judy tree is one example of an efficient data structure that may form the first data structure stored in the primary memory store 121. A Judy tree is a well-known type of associative array data structure with a small memory footprint that may be quickly searched and referenced. The storage virtualization system 111 will be able to quickly refer to the Judy tree stored in the primary memory store 121 to determine whether or not a requested data object is stored on an associated NAS system. For example, the Judy tree may contain the FID for the requested data object and some additional metadata for that data object. By restricting the first data structure or Judy tree to containing FIDs and additional metadata, it ensures that it can be quickly searched. The low memory footprint also provides the primary memory store 121 with sufficient memory space to store portions of the second data structure, as will be described further below.

One skilled in the art will appreciate that there are a number of ways to optimize the first data structure in the primary memory store 121. For example, in an embodiment of the present invention, the Judy tree may be comprised of FIDs for managed data objects and path addresses for those data objects. In such a situation, the storage virtualization system 111 may be able to direct access to a requested data object stored on the associated NAS system 131 as soon as the FID is located in the first data structure. The path address will reveal the location of the requested data object in the associated NAS system 131.

While the present invention contemplates that the first data structure may include respective path addresses for the managed data objects, one skilled in the art will appreciate that storing path addresses in the Judy tree may in fact take up more memory on the primary memory store 121, since path addresses can be lengthy and complicated, depending upon the associated NAS system 131. By taking up more memory, it may slow down a search of the first data structure, thereby sacrificing efficiency. Therefore, in an embodiment, the first data structure or Judy tree may contain FIDs and a "memory address" for the managed data object. A person skilled in the art will appreciate that a memory address is a type of metadata that points to a location within the memory of the storage virtualization system 111. In the present invention, this memory address may point to a location in the primary memory store 121, or the secondary memory store 171. As a result, the memory address is generally shorter than a path address. In other words, the memory address differs from a data object's path address, which is the data object's location on the NAS system. By storing a data object's FID and associated memory address, the first data structure or Judy tree remains compact and therefore keeps a smaller memory footprint in the primary memory store 121. Use of a memory address will also enable the first data structure to interact and refer to the second and/or third data structures, as explained below.

2. The Second Data Structure in the Primary Memory Store and the Third Data Structure in the Secondary Memory Store The second data structure may contain additional metadata for the data objects managed by the storage virtualization system 111 and stored on the associated NAS system 131. While the first data structure may be a Judy tree or other index designed for fast FID lookup, the second data structure is designed to provide more information about a managed data object to the storage virtualization system 111, such as its path address, last access time, size, creation date, permissions, etc. As a result, the second data structure may have a much larger memory footprint than the first data structure.

Initially, the second data structure may be created and stored on the primary memory store 121 in an area not taken up by the first data structure. Because the second data structure may grow and may require more memory space, the second data structure may later be copied or moved into the secondary memory store 171, thereby forming a third data structure in secondary memory store 171. The third data structure may be separate in location from the second data structure, but it may also contain some of the same information as the second data structure, or may be considered a subset of the second data structure. In other words, one skilled in the art will appreciate that the third data structure may be a logical extension of storage for the second data structure, but stored in the secondary data store 171 instead of the primary memory store 121. The process of copying or moving in portions of the second data structure to create or add to the third data structure is known as "caching out" from the primary memory store 121 to the secondary memory store 171, and is discussed further below.

Figure 2:
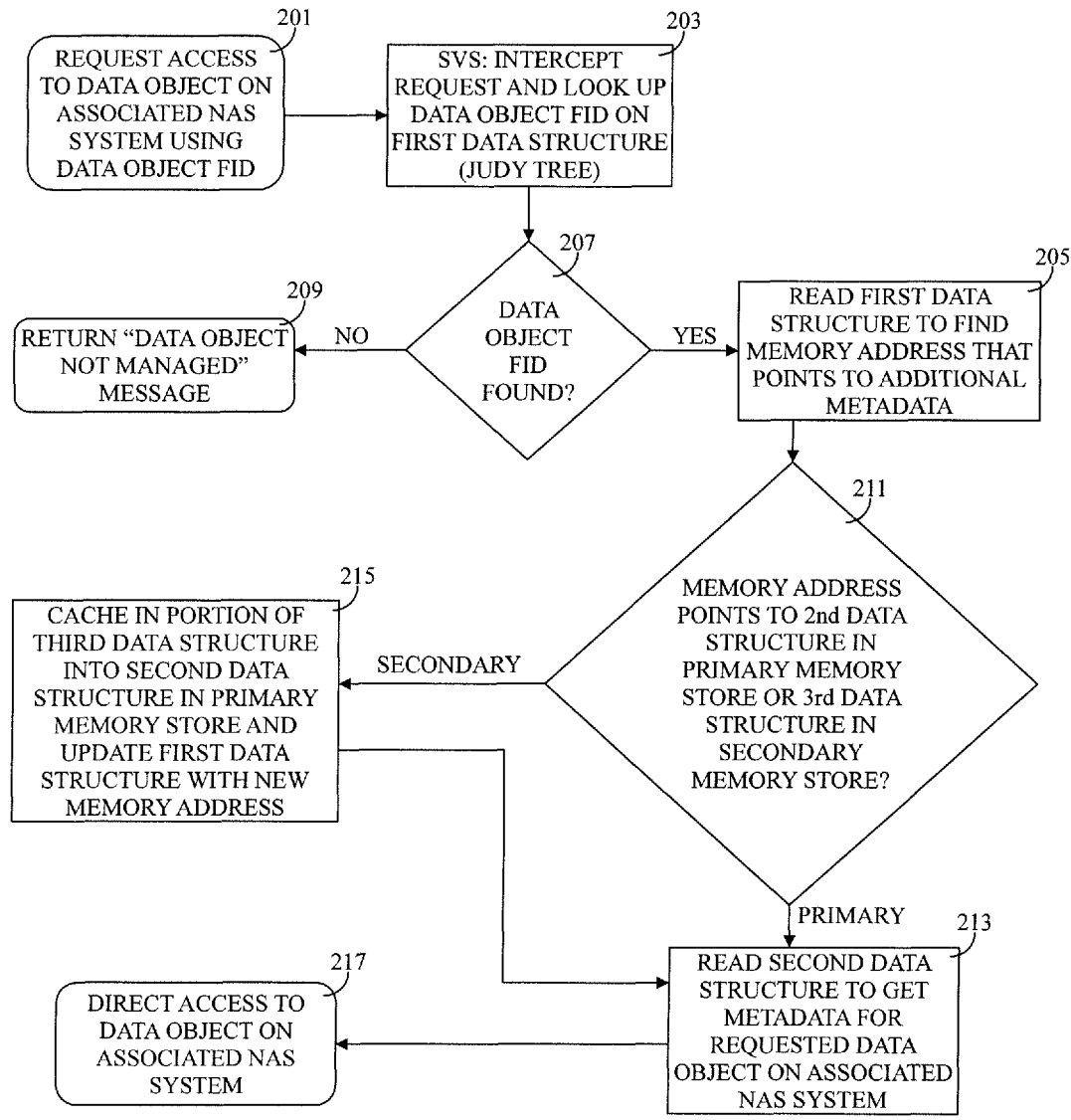
FIG. 2 is an exemplary flow diagram illustrating the steps of an embodiment of the present invention.

FIG. 2 illustrates how the first data structure or Judy tree works in conjunction with the second and third data structures in order to take advantage of the additional memory resources provided by the secondary memory store 171. In this example, the Judy tree contains the FIDs and memory addresses for managed data objects stored in associated NAS system 131. As shown in FIG. 2, when a client computer requests access to a managed data object on associated NAS system 131 (step 201), the storage virtualization may intercept this request and may look up the data object's FID by referring to the Judy tree stored in its primary memory store 121 (step 203). A person skilled in the art will appreciate that a request for a data object may not originate from a client computer, but may be a request from another hardware or software module with access to the storage virtualization system 111, or may even be an internal request from the storage virtualization system 111 itself.

Referring again to FIG. 2, if the data object's FID is found in the primary memory store 121's Judy tree (step 207), the storage virtualization system 111 may read the Judy tree to determine the memory address for that data object (step 205). This memory address may point to where additional metadata (such as the path address to the requested data object's location in the associated NAS system 131) for the requested data object is located. The additional metadata may be found in the second data structure located in the primary memory store 121, or the additional metadata may be found in the third data structure in the secondary memory store 171 (step 211) if this metadata has been cached out. One will appreciate that any data object identified in the second or third data structures of the storage virtualization system will have a memory address.

In an embodiment, the data object's memory address may reveal that the second data structure in the primary memory store 121 contains the requested data object's additional metadata. In this case, the storage virtualization system 111 may read the second data structure, find the path address or other metadata for that data object on the associated NAS system 131 (step 213), then may direct access to the requested data object in the associated NAS system 131 (step 217). On the other hand, if the data object's memory address reveals that the requested data object's additional metadata is located in third data structure in the secondary memory store 171, then this metadata may be cached in to the second data structure of primary memory store 121 before access may be directed (step 215). This situation arises when the relevant portion of the second data structure has been moved ("cached out") from the primary memory store 121 to the secondary memory store 171 to create or add to the third data structure. Since after caching out, the location of the requested data object's metadata has changed from the second data structure in the primary memory store 121 to the third data structure in the secondary memory store 171, then the memory address for that additional metadata will also change. As a result, the first data structure will need to be updated with the revised memory address (step 215).

As noted above, if the FID for the requested data object is not found in the first data structure, then the storage virtualization system may return a message stating that the requested data object is not managed by the storage virtualization system (step 209). One having ordinary skill in the art will appreciate that other equivalent messages may also be returned.

In another example, there may be a request for other information about a managed data object besides a request for access. For example, there may be request for timestamp information or other information typically stored in metadata. Since this information may be found in the second or third data structures, the storage virtualization system 111 may follow the process illustrated in FIG. 2, or a similar process, in order to find this information. One having ordinary skill in the art will appreciate that there are other ways that the data structures in the primary memory store and the secondary memory store may work together.

Besides the examples provided above, a person skilled in the art will appreciate that there may be other ways to refer to the managed data objects besides memory or path addresses, i.e. hash IDs. For example, a managed data object may not be a file or a directory, but may be a hard link or soft link pointing to target. In such a case, the data object may not have a memory address, but instead, the target will have a memory address. In order to allow the storage virtualization system to maintain access to the data object, the memory address for the target may be stored in the first data structure.

One having ordinary skill in the art will also appreciate that the use of a memory address is merely exemplary. In some circumstances, the absolute path address for the data object may be stored in the Judy tree. In other cases, the relative path addresses for each managed data object on the associated NAS system may be used in the Judy tree.

One will also appreciate that there are many ways to refer to a managed data object and its associated metadata, so long as the storage virtualization system can recognize the metadata and associate it with a managed data object.

As the above examples demonstrate, not only does the present invention provide a storage virtualization system with the capability to manage dramatically increased numbers of data objects, but the present invention ensures that the data objects are managed efficiently. Because the storage virtualization system is associated with a secondary memory store 171 with a third data structure that complements or is used in conjunction with the first or second data structures in the primary memory store 121, it is important that the usage of the data structures is fast and dynamic.

D. Cache Out/Cache In

The present invention provides the storage virtualization system with the ability to work seamlessly with both its primary memory store 121 and its secondary memory store 171 in a resource and memory-efficient manner. For example, in one embodiment, the second data structure may take up a significant portion of the primary memory store 121. When the memory resources of the primary memory store 121 reach a certain threshold, these resources may need to be freed up by copying or moving portions of the second data structure to create or add to a third data structure in the secondary memory store 171 in order to further ensure cohesiveness between the three data structures. This is known as "caching out." Portions of the second data structure may be cached out from the primary memory store 121 may continue until sufficient memory sources become available or reaches a lower threshold, which may be set by the storage virtualization system 111 or a system administrator.

One with ordinary skill in the art will appreciate that the caching in and caching out functions of the present invention differ from the generalized caching functions found in virtual random access memory ("VRAM"). Whereas VRAM caches out data, the cohesive nature of the data is generally not considered. In other words, when VRAM performs caching functions, the interrelationships between the data are ignored. In the present invention, the storage virtualization system 111 considers the cohesive nature of the metadata, such that metadata may not be randomly cached out, but only cached out when it is necessary and efficient to do so to maintain storage virtualization performance.

Caching out ensures consistency between the data structures, and optimizes the memory resources between primary memory store 121 and secondary memory store 171. Indeed, it is possible to cache out all of the second data structure in the primary memory store 121 to the third data structure in secondary memory store 171. However, one skilled in the art will appreciate that maintaining relevant portions of the second data structure in the primary memory store 121 may be more efficient than caching them out completely to the secondary memory store 171. For example, the storage virtualization system 111 may refer to the first data structure to find a memory address for a requested data object (step 203). If the memory address points to a location in the primary memory store 121, then the storage virtualization system will be able to access that location faster. This is because the primary memory store 121 may be internal and part of the hardware of the storage virtualization system 111 (as shown in FIG. 1), while the secondary memory store 171 may be remote from the storage virtualization system 111. Maintaining relevant metadata in a second data structure in the primary memory store 121 reduces the time it takes to refer to those relevant portions by avoiding remote access, thereby increasing the efficiency of the present invention. Even if the secondary memory store 171 is internal within the storage virtualization system 111, it may still be more efficient to keep relevant portions of the second data structure in the primary memory store 121 because the primary memory store 121 is typically of a type that is faster than the secondary memory store 171. The benefit of keeping a second data structure in the primary memory store 121, rather than caching out the second data structure completely to the secondary memory store 171 becomes more apparent when there are repeated requests for those managed data objects.

However, as mentioned above, it may be necessary or desirable to cache out portions of the second data structure from the primary memory store 121 to create or add to the third data structure in the secondary memory store 171, thereby reducing the memory load of the first and second data structures on the primary memory store 121. Determining which portions of the second data structure to cache out may require an algorithm or other mechanism for tracking frequently requested data objects. One such algorithm makes use of a Least Recently Used ("LRU") data object list. This LRU list may be stored in the primary memory store 121, but separately from the data structures in the primary memory store 121. Alternatively, the LRU list may form part of the first or second data structure in the primary memory store 121. Data objects that are least recently used, and are therefore on the LRU list, may have their metadata cached out from the relevant portion of the second data structure in the primary memory store 121. As a result, only metadata for data objects that are most recently used are kept in the portion of the second data structure in the primary memory store 121.

The storage virtualization system 111 can be configured to check the LRU list periodically and perform the appropriate caching out operations in order to maximize memory resources. In an embodiment, once a data object's metadata has been cached out from the primary memory store 121, the data object is no longer listed on the LRU list. In other words, the data object cannot be listed on the LRU list if its metadata is not found in the primary memory store 121. Further, one having ordinary skill in the art will appreciate that once metadata from the second data structure has been cached out to the secondary memory store 171, the first data structure must be updated with the new memory address for that cached out metadata.

One skilled in the art will also appreciate that the LRU list is but one algorithm that may be used to identify which portion of the second data structure may be cached out from the primary memory store 121 to the third data structure in the secondary memory store 171. Other algorithms may be used without departing from the scope of the invention. For example, while the LRU list may identify a list of single data objects, multiple clusters of related data objects that are least recently used may also be cached out of the second data structure in the primary memory store 121 to the secondary memory store 171. One having ordinary skill in the art will appreciate that when portions of the second data structure are cached out to the secondary memory store 171 to create or add to a third data structure, these cached in portions may be deleted from the primary memory store 121. Alternatively, caching out may involve copying portions of the second data structure to create or add to the third data structure in the secondary data store 171, rather than moving or deleting portions of the second data structure. In other words, the second data structure remains intact in the primary memory store 121 even after caching out to the secondary memory store 171.

In an embodiment, portions of the third data structure stored in the secondary memory store 171 may also be copied or transferred ("cached in") from the secondary memory store 171 to the primary memory store 121 (step 215 of FIG. 2). This may occur when the storage virtualization system 111 receives or intercepts a request for a managed data object whose metadata was been previously cached out. This may also occur if the third data structure is created first in the secondary memory store 171, and is later cached in to create or add to the second data structure in the primary memory store 121. In another example, there may be a situation where the primary memory store 121's data structures are lost or corrupted, and the third data structure in the secondary memory store 171 serves as a backup. As will be discussed below, the third data structure may be cached in to the primary memory store 121 to re-create the first and second data structures. A person skilled in the art will also appreciate that once the second data structure has been changed after caching in metadata from the third data structure, then the corresponding memory addresses in the first data structure may have to be updated (step 215 of FIG. 2).

Caching in and caching out may also involve synchronizing the portions of the second data structure in the primary memory store 121 and the third data structure in the secondary memory store 171. This may occur when the relevant portions of the second data structure are copied to the secondary memory store 171 to create or add to the third data structure, rather than moved to the secondary memory store 171. In such a circumstance, the present invention ensures that the copied data structures in the primary memory store 121 and the secondary memory store 171 are up-to-date and synchronized. For example, one skilled in the art will appreciate that after data objects on the associated NAS system are accessed, they may change in some way, i.e., be moved, renamed, or deleted. The storage virtualization system 111 may inherently keep track of these changes, since this is part of its design. The storage virtualization system 111 may therefore update the second data structure in its primary memory store 121 to reflect any changes to the associated NAS system's data objects. Periodically, the storage virtualization system 111 may then also update the "copy" of the second data structure (i.e., the third data structure) in the secondary memory store 171. The frequency of these updates or synchronizations may be set by a system administrator, or may be automatic whenever the storage virtualization system 111 completes a storage virtualization operation or transaction.

The ability of a storage virtualization system to cache out and cache in metadata for all types of data objects on an associated NAS system has benefits beyond those described above. For example, caching in may permit the transfer or copying of metadata for multiple data objects. For example, in some instances, the client computer may request access to an entire file directory, rather than a single file. The Judy tree or first data structure may contain a notation that recognizes when a data object being accessed is a directory or an individual file. For example, if the Judy tree retains directory tree information, then the storage virtualization system will know when files are accessed or if whole directories are accessed. In another example, metadata associated with a data object may identify whether the data file or data directory is accessed. If it is a directory, then the present invention may cause the storage virtualization system 111 to use the Judy tree to identify all of the files associated with that directory. The FIDs for all of the associated files may be identified, then the respective memory addresses for the associated files may be located. Once located, then the metadata for each data object in the directory may be cached into the primary memory store 121 if they do not already exist there.

In another example, the client computer may request access to a particular managed data object on the associated NAS system 131, but the first, second or third data structures may reveal that this data object is linked to or related to other files as well. For example, the "last access time" metadata for the file (in the second data structure) may reveal that when it was last accessed, other files were also accessed at the same time. As such, the storage virtualization system may recognize that the client computer always requests access to the same series of data objects. This pattern of behavior may be stored with the data structures to increase the efficiency of the storage virtualization system. By identifying these patterns, the storage virtualization system can ensure that certain sets or clusters of data objects' metadata remain or are cached in to the primary memory store 121 whenever one data object from the group is requested. The present invention thereby optimizes the performance of the storage virtualization system 111 by providing an "intelligent" cache in/cache out algorithm. In other words, the present invention provides management of cohesive metadata for a data object stored on an associated NAS system, by understanding the interrelationships between the managed data objects and caching in or caching out in a non-random manner.

The examples described above are some of the ways memory resources may be adjusted by caching in and caching out metadata from the primary memory store 121. One will also appreciate that certain metadata may be configured to remain in the primary memory store 121. For example, the first data structure may generally remain in the primary memory store 121. Additionally, some metadata in the second data structure may also be configured such that it is never cached out or removed from the primary memory store 121. Other configurations are possible without limiting the scope of the present invention.

E. Data Structure Recovery

Using the system and method of the present invention may provide additional safeguards in the event of storage virtualization system failure. These safeguards do not presently exist in the art. For example, should the primary memory store 121 or the storage virtualization system 111 itself become corrupted due to hardware failure or some other system error, the third data structure on the secondary memory store 171 may act as a backup source for the metadata stored in the primary memory of the storage virtualization system. This may be possible if the third data structure in the secondary memory store 171 contains all of metadata for the managed data objects stored in the associated NAS system 131.

In order to provide backup functions, the secondary memory store's data structure should store all of the metadata for the data objects stored on the associated NAS systems. By storing all the data objects' metadata, the first and/or second data structures can be rebuilt on the original storage virtualization system, or on a backup physical hardware device. The memory addresses for all of the managed data objects' metadata will point to the third data structure in the secondary memory store 171. Additionally, the third data structure will also contain the FIDs for the managed data objects, which may be associated with the respective memory addresses. With these two pieces of information, the first data structure may be rebuilt. Further, since the second data structure may be a copy of a portion of the third data structure, it may also be re-created. This may reduce the need for extensive scans of the associated NAS systems to re-create the primary memory store 121's data structures, since the secondary memory store 171's third data structure should already be up to date.

In a further example, the third data structure in the secondary memory store 171 may itself be backed up to a tertiary memory store in order to provide additional safeguards. As such, either the third data structure or the primary memory store 121's data structures could be recovered using the backup data structure.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. For example, while the present invention is described in terms of a first and a second data structure, aspects of the present invention may be employed by a single data structure, or a plurality of data structures. Further, the present invention is described with reference to a primary memory store and a secondary memory store. The present invention also contemplates additional memory stores. The description of the preferred embodiments is not intended to limit the scope of the claims appended hereto.

What is claimed is:

1. A method for storage virtualization comprising:
    providing a storage virtualization system connected to a network-attached storage (NAS) system, the storage virtualization system being separate and apart from the NAS system, the NAS system storing a plurality of data objects, the storage virtualization system having a primary memory store and a secondary memory store, wherein the primary memory store and the secondary memory store are non-volatile memory systems;
    storing, in the primary memory store, a first data structure containing first metadata for at least one of the plurality of data objects stored in the NAS system, and a second data structure containing second metadata for the at least one of the plurality of data objects stored in the NAS system, the second data structure having a larger memory footprint than the first data structure, the first metadata directing the storage virtualization system to the second data structure to obtain corresponding second metadata for the at least one of the plurality of data objects;
    identifying a least recently used data object of the plurality of data objects stored in the NAS system, the least recently used data object having corresponding second metadata in a corresponding second data structure stored in the primary memory store; and
    storing, in the secondary memory store, a third data structure containing the corresponding second metadata for the least recently used data object, the first metadata being modified to direct the storage virtualization system to the third data structure to obtain the corresponding second metadata.

2. The method of claim 1, wherein the secondary memory store is remote to the storage virtualization system.

3. The method of claim 1, wherein the first metadata in the first data structure maps to the second metadata in the second data structure.

4. The method of claim 1, wherein the second metadata in the second data structure maps to the at least one of the plurality of data objects stored in the NAS system.

5. The method of claim 1, wherein the first data structure is selected from the group consisting of an index, a fast lookup table and a Judy tree.

6. The method of claim 1, wherein the first metadata or the second metadata contains a memory address for the at least one of the plurality of data objects.

7. The method of claim 1, wherein the first metadata or the second metadata contains a path address for the at least one of the plurality of data objects.

8. The method of claim 1, further comprising updating the first metadata in the first data structure.

9. The method of claim 1, further comprising transferring at least a portion of the third data structure to the primary memory store.

10. The method of claim 9, further comprising updating the first metadata in the first data structure.

11. The method of claim 10, further comprising updating the second metadata in the second data structure.

12. A system for storage virtualization comprising:
    a storage virtualization system connected to a network-attached storage (NAS) system storing a plurality of data objects, the storage virtualization system being separate and apart from the NAS system, the storage virtualization system having a primary memory store for storing a first data structure containing first metadata for at least one of the plurality of data objects stored in the NAS system, and a second data structure containing second metadata for the at least one of the plurality of data objects stored in the NAS system, the second data structure having a larger memory footprint than the first data structure, the first metadata directing the storage virtualization system to the second data structure to obtain corresponding second metadata for the at least one of the plurality of data objects, wherein the at least one of the plurality of data objects stored in the NAS system is a least recently used data object, the least recently used data object having corresponding second metadata in a corresponding second data structure stored in the primary memory store, the secondary memory store storing a third data structure containing the corresponding second metadata for the least recently used data object, the first metadata being modified to direct the storage virtualization system to the third data structure to obtain the corresponding second metadata and wherein the primary memory store and the secondary memory store are non-volatile memory systems.

13. The system of claim 12, wherein the primary memory store and the secondary memory store are located within the storage virtualization system.

14. The system of claim 12, wherein the secondary memory store is remote to the storage virtualization system.

15. The system of claim 12, wherein the secondary memory store is a disk.

16. A non-transitory computer-readable storage medium with an executable computer program for storage virtualization stored thereon, the computer program including instructions to:
   store, in a primary memory store of a storage virtualization system connected to a network-attached storage (NAS) system, the NAS system storing a plurality of data objects, a first data structure containing first metadata for at least one of the plurality of data objects, and a second data structure containing second metadata for the at least one of the plurality of data objects, the second data structure having a larger memory footprint than the first data structure, the first metadata directing the storage virtualization system to the second data structure to obtain corresponding second metadata for the at least one of the plurality of data objects;
   identify a least recently used data object of the plurality of data objects, the least recently used data object having corresponding second metadata in a corresponding second data structure stored in the primary memory store; and
   store, in a secondary memory store of the storage virtualization system, a third data structure containing the corresponding second metadata for the least recently used data object, the first metadata being modified to direct the storage virtualization system to the third data structure to obtain the corresponding second metadata, wherein the storage virtualization system is separate and apart from the NAS system and wherein the primary memory store and the secondary memory store are non-volatile memory systems.

17. The non-transitory computer-readable storage medium of claim 16, wherein the computer program including further instructions to:
   transfer at least a portion of the third data structure to the second data structure.

18. The non-transitory computer-readable storage medium of claim 17, wherein the computer program including further instructions to update the first data structure.

19. The non-transitory computer-readable storage medium of claim 16, wherein the computer program including further instructions to update the second data structure.

20. The non-transitory computer-readable storage medium of claim 16, wherein the computer program including further instructions to update the third data structure.

* * * * *